J. D. McMICHAEL & F. H. CLEMENT.
SEGMENT JOINTING ATTACHMENT FOR SAW BENCHES.
APPLICATION FILED JULY 22, 1918.
1,299,367.
Patented Apr. 1, 1919.
2 SHEETS—SHEET 1.
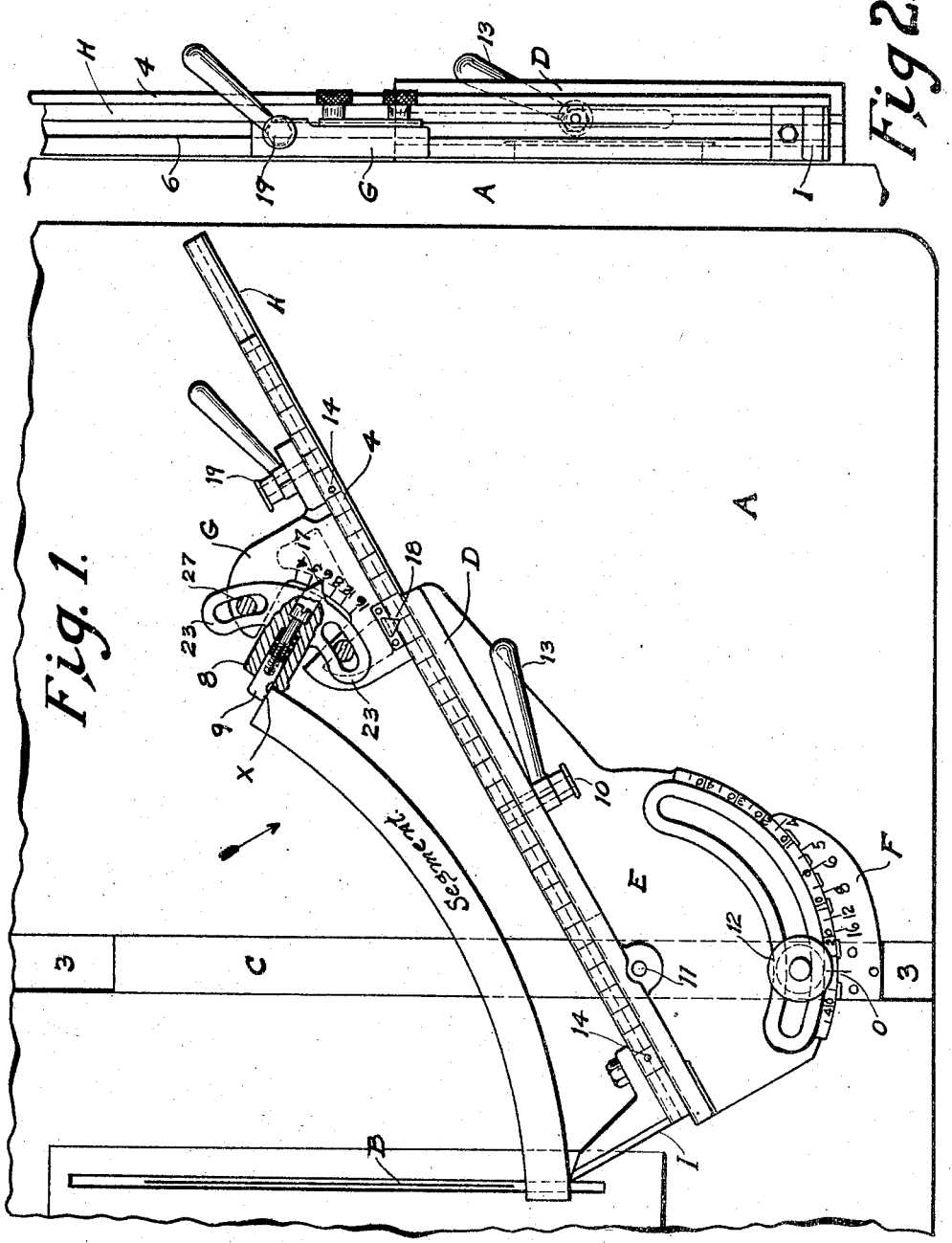
WITNESSES:
George H. Powell
INVENTORS
James D. M<sup>c</sup> Michael
Frank H. Clement
BY
ATTORNEY J. D. McMICHAEL & F. H. CLEMENT.
SEGMENT JOINTING ATTACHMENT FOR SAW BENCHES.
APPLICATION FILED JULY 22, 1918.
1,299,367.
Patented Apr. 1, 1919.
2 SHEETS—SHEET 2.
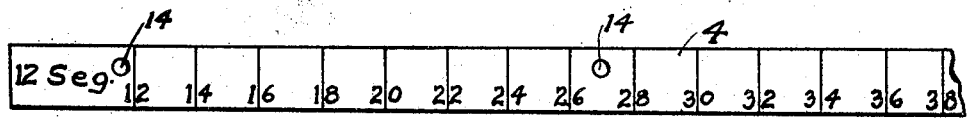
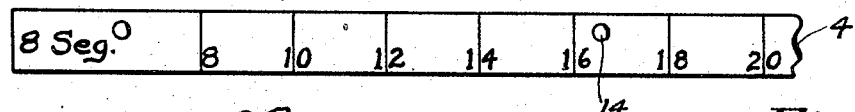
Fig. 6.
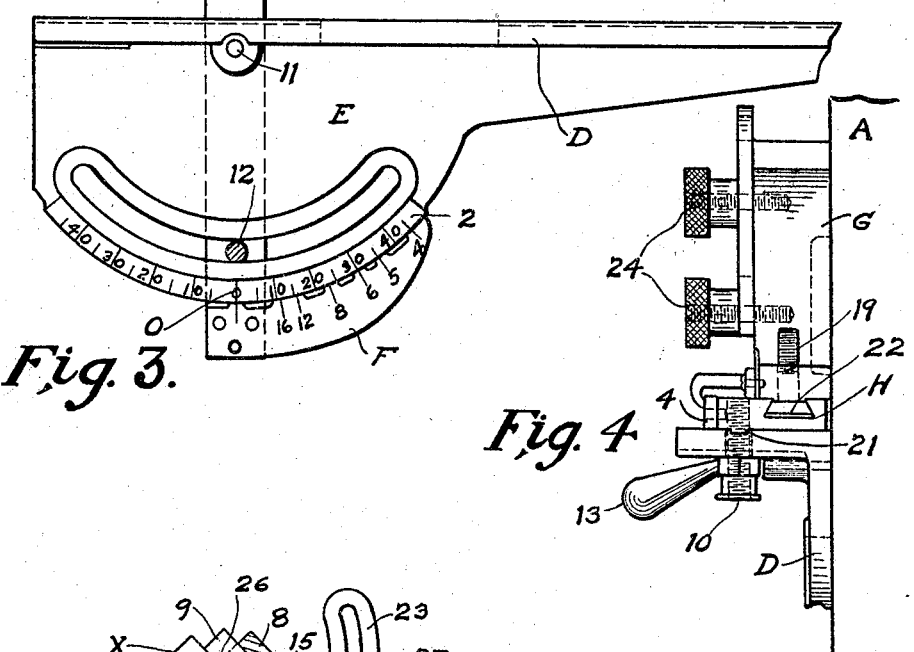
Fig. 3.
Fig. 4.
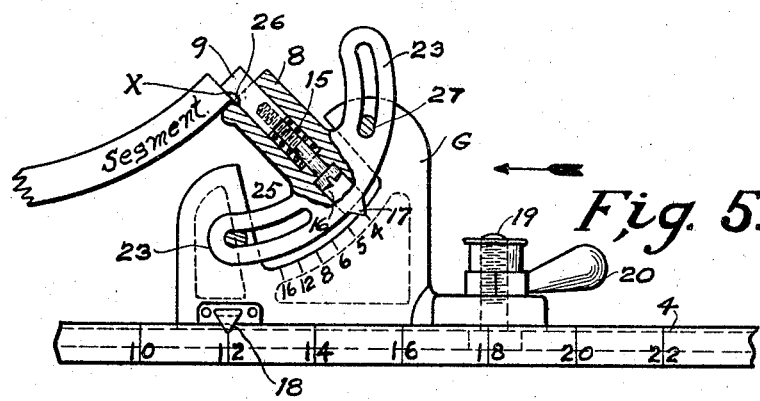
Fig. 5.
WITNESSES:
George H. Powell
INVENTORS
James D. McMichael.
Frank H. Clement.
BY
Church & Rich
ATTORNEY

UNITED STATES PATENT OFFICE.

JAMES D. McMICHAEL AND FRANK H. CLEMENT, OF ROCHESTER, NEW YORK.

SEGMENT-JOINTING ATTACHMENT FOR SAW-BENCHES.

1,299,367.  Specification of Letters Patent.  Patented Apr. 1, 1919.

Application filed July 22, 1918. Serial No. 246,001.

*To all whom it may concern:*

Be it known that we, JAMES D. MCMICH-AEL and FRANK H. CLEMENT, citizens of the United States, residing in the city of Rochester, county of Monroe, State of New York, have invented certain new and useful Improvements in Segment-Jointing Attachments for Saw-Benches, of which the following is a specification.
The object of our invention is to provide a simple portable and easily adjusted gage for cropping and jointing the ends of wood segments which are used in building up pulley rims, circular patterns, architectural forms, etc., and it consists mainly in applying scales and graduations to a swiveling cut-off gage, whereby there are indicated at a glance the number of segments required to complete the circle the correct angle at which it is necessary to adjust the gage to make an accurate joint for various diameters and also to indicate proposed diameters.

In the drawings, Figure 1 is a plan view of a saw table with our segment gage applied. Fig. 2 is an elevation of the gage and attachments looking in the direction of the arrow, Fig. 1. Fig. 3 is an enlarged view of the swiveling cut-off gage and its guiding tongue. Fig. 4 is an end elevation of the gage with the segment attachment. Fig. 5 is an enlarged sectional elevation of the stop head and diameter scales. Fig. 6 is a plan view of the diameter scales.

A, Figs. 1, 2 and 4, is the table of a sawing machine through a slot in which a circular saw B projects. C is a guiding tongue moving freely in a slot 3 in the table, and to this tongue a swiveling cut-off gage D is pivoted at 11. A clamping screw 12 secures the gage flange E at any angle to the tongue as indicated on the graduated quadrant 2 on the edge of flange E. On the face of the gage fence D, a bar H is attached, by means of a tongue and groove 21, Fig. 4, and a clamping screw 10 moving in a slot in the gage fence or by other equivalent means. This permits the bar H to be adjusted along the face of the gage fence D. It should be noted in this connection that the function of the extension bar H is two-fold; to extend the gage fence D to cover any probable large diameters, and to form a carrier for the stock supports, thus making the attachment self contained. I is a support, secured to the bar H near its inner end against which a segment S is placed to be jointed by the saw, and a stop-head G, made adjustable along the bar H, locates the other end of the segment.

The above parts are not new, having been heretofore used for a similar class of work. Our invention relates to the peculiar construction of the stop head G and to the means of determining the angle of the gage D, with reference to the tongue C and saw B, and to the means of indicating by detachable scales the various diameters of the work. In our device it is also possible to use the fence of the gage D as a supporting bar for the parts without the bar H.

Heretofore it has been customary to mark off angular lines on the surface of the table to indicate the angle of the gage for the various number of segments in the circle, and on these lines to mark the diameters of the circles for the purpose of adjusting the stop head thereto. This is a costly method and is next to impossible to apply accurately to a table already in use, and furthermore cannot be added to nor changed after it is applied.

For the purpose of indicating the proper angle for the various number of segments in a circle, we provide a graduated curved plate F, Figs. 1 and 3, on which are indicated the angle at which the cut-off gage must be set for each number of segments. The plate F is fixed rigidly to the tongue C, and the zero line O on the quadrant 2, is placed at any graduation and the gage clamped by wheel 12. This does away with the lines on the table and in practice produces accurate results. The zero line O is also used for the ordinary adjustments of the gage as indicated by the degrees thereon, and the plate F in no way interferes with such ordinary uses of the gage.

For indicating the various diameters of circles to be made up from segments, we use a series of special scales 4, Figs. 1, 5 and 6, which are interchangeably attached to the edge of the gage D or to the edge of the extension bar H by means of dowel pins 14, or in any other suitable manner.

In our device the bar H may be omitted by extending the gage fence far enough to accommodate any probable length of segment, but in that case the entire cut-off gage E. D. must be removed from the pivot 11 and replaced by another gage for general purposes.

These scales are graduated to indicate the position of the stop head G for the various diameters required, and each scale is thus adapted to a specific number of segments in the circle and is so stamped at one end. An index 18, Figs. 1 and 5, is secured to the stop head G, so that the latter may be accurately adjusted to the required length of segment for each diameter.

The stop head G is attached to the bar H by means of a clamp bolt 19 which for convenience has a dovetailed head and moves in corresponding slot 22, Fig. 4, in the bar H, or in the gage fence. A stock support 8, Figs. 1 and 5, is applied to the stop head by means of slotted segment flanges 23 and clamp wheels 24, Fig. 4. A recess 25, Fig. 5, in the stop head permits the circular adjustment of the support 8 on the studs 27 which are fitted into the slots in flanges 23. The center of the arc in which the support 8 adjusts, lies at X in the face of the retreating stop 9, where it contacts with the end of any segment S. 17 is an index attached to the stock support 8 and an adjacent graduated arc on the stop head enables the operator to adjust the support 8 to the proper angle. The retreating stop 9 is fitted to move freely in a slot in the support 8, and is held in position by a screw 16 and a light spring 15, the head of the screw limiting the projection of the stop from the support 8. The object of the circular adjustment of the support 8, is that the face of the stop 9 shall always bear against the segment S in the radial line to which it has been previously jointed. In order to neutralize any possible inaccuracy at this point a recess 26 may be made in the face of the stop as shown in Fig. 5.

The method of using our invention is as follows: The segment attachment comprising the slotted bar H, stop head G, support I and scales 4 is secured to the cutoff gage D by means of the clamp screw 10, moving in a slot in the fence D, and wrench 13, Figs. 1 and 4, and the bar H is adjusted on the gage so that the support I, passes close to the saw B when the gage is pushed forward in the slot 3. The gage is then set to the proper angle shown in the plate F, for the number of segments to the circle and the corresponding scale 4 is selected and placed in position on bar H. The stop head G is now adjusted on the bar H to the required diameter of circle and the segment S laid against the supports 8 and I in such a position that the saw will crop off and joint the left hand end, the retreating stop 9 being pushed in by the segment, the latter lying face down on the table A: the segment is then reversed and the jointed end placed against the side of the stop 9, while the other end is being jointed by the saw: this produces the finished segment ready to be glued into its place in the circle.

It will be seen that the segment attachment can be detached as a unit from the cutoff gage, which then has its usual functions without any change in construction except the addition of the plate F: also that the detached segment gage is complete in itself, requiring only the graduated plate F to make it complete, and that it can be attached again for use almost instantaneously, requiring no previous preparation or graduation of the table or of the cutoff gage except as above noted. The convenience and accuracy of this device has been thoroughly tested and approved by users, and it can be easily applied to any saw table which has a sliding cutoff gage and guiding tongue: subsequent hand jointing of the segments thus prepared is not required.

What we claim as our invention and desire to secure by Letters Patent is:

1. In a segment jointing attachment for saw tables, the combination with a tongue slidably mounted on the table, of a gage pivoted to said tongue, a scale secured to the gage, a stop head adjustable on said scale and having an index coöperating therewith, a support for a work piece on the gage, and a coöperating support for the work piece on the stop head.

2. In a segment jointing attachment for saw tables, the combination with a tongue slidably mounted on the table, of a gage pivoted to said tongue, a scale secured to the gage, a stop head adjustable on said scale and having an index coöperating therewith, a support for a work piece on the gage, a second support for the work piece angularly adjustable on the stop head, and means for indicating the angular position of the latter support on the stop head.

3. In a segment jointing attachment for saw tables, the combination with a tongue slidably mounted on the table, of a gage pivoted to said tongue, a support for a work piece on said gage, a stop head adjustably connected with said gage, a coöperating work support on said stop head, and a stop on said support adapted to be moved to an inoperative position by the workpiece.

4. In a segment jointing attachment for saw tables, the combination of a tongue slidably mounted on the saw table, a gage pivoted to said tongue for adjustment, an accurate scale on said tongue adapted to indicate the angular adjustment of said gage, a fence on said gage, a scale detachably secured to said fence, and a stop head adjustable on said scale.

5. In a segment jointing attachment for saws, the combination of a cutoff gage having a fence, a stop head adjustable along said gage fence, a work support having an angular adjustment on said stop head about a center lying in the contact face of the support, whereby the contact face of the support projects a fixed distance from the stop head in all positions of adjustment, and means for securing the work support in adjusted position on the stop head.

6. In a segment jointing attachment for saw tables, the combination of a cutoff gage, a stop head adjustable thereon and having an opening therein, a work support in said opening angularly adjustable on said stop head about a center in the contact face thereof, and means for securing the work support in adjusted position on the stop head.

7. In a segment jointing attachment for saw tables, the combination of a cutoff gage, a stop head adjustable thereon, a work support adjustable on said stop head about a center in the contact face thereof and having a recess therein, a retreating stop movable in said recess, and means for returning said stop to normal projected position.

8. In a segment jointing attachment for saw tables, the combination with a tongue slidably mounted on the table, of a gage pivoted to said tongue, a work support on said gage adjacent the saw, a second work support, a stop head adjustable on said gage on which said second work support is mounted, and a detachable scale coöperating with said gage and stop head and adapted to indicate the position of the stop head relatively to the first mentioned work support for the various diameters.

JAMES D. McMICHAEL.
FRANK H. CLEMENT.

Witnesses:
C. S. RICHMAN,
GEORGE G. ELY.

Copies of this patent may be obtained for five cents each, by addressing the "Commissioner of Patents, Washington, D. C."